United States Patent
Wang et al.

(10) Patent No.: US 12,136,188 B2
(45) Date of Patent: Nov. 5, 2024

(54) IMAGE/VIDEO SUPER RESOLUTION

(71) Applicants: Beijing Bytedance Network Technology Co., Ltd., Beijing (CN); ByteDance Inc., Los Angeles, CA (US)

(72) Inventors: Meng Wang, Kowloon (CN); Jizheng Xu, Los Angeles, CA (US); Li Zhang, Los Angeles, CA (US); Shiqi Wang, Kowloon (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 400 days.

(21) Appl. No.: 17/453,968

(22) Filed: Nov. 8, 2021

(65) Prior Publication Data
US 2022/0148131 A1  May 12, 2022

(30) Foreign Application Priority Data
Nov. 9, 2020 (WO) ............. PCT/CN2020/127585

(51) Int. Cl.
G06T 3/4076 (2024.01)
G06T 3/4046 (2024.01)

(52) U.S. Cl.
CPC .......... *G06T 3/4076* (2013.01); *G06T 3/4046* (2013.01)

(58) Field of Classification Search
CPC ... G06T 3/4053; G06T 3/4046; G06T 3/4076; G06V 10/82
See application file for complete search history.

(56) References Cited

U.S. PATENT DOCUMENTS

| | | | |
|---|---|---|---|
| RE40,201 E * | 4/2008 | Kim | G09G 5/005 386/230 |
| 8,682,110 B2 * | 3/2014 | Shin | H04N 7/0125 362/238 |
| 8,811,774 B1 * | 8/2014 | Chen | G06T 3/4053 382/300 |
| 11,263,726 B2 * | 3/2022 | Manimaran | G06T 3/4053 |
| 2018/0218519 A1 * | 8/2018 | Almutiry | G06F 18/22 |
| 2020/0162789 A1 * | 5/2020 | Ma | H04N 21/440263 |
| 2023/0052774 A1 * | 2/2023 | Kim | H04N 19/30 |

* cited by examiner

*Primary Examiner* — Daniel G Mariam
(74) *Attorney, Agent, or Firm* — Astute IP Law Group

(57) ABSTRACT

Embodiments of the present disclosure provide a solution for image/video super resolution. A method for image processing is proposed. The method comprises: receiving a first image with a first resolution and at least one reference image associated with the first image, the first image and the at least one reference image being associated with a same video; determining a difference between the first image and the at least one reference image; and generating a second image with a second resolution based on the difference, the first image and the at least one reference image, the second resolution being higher than the first resolution.

19 Claims, 10 Drawing Sheets

IMAGE/VIDEO SUPER RESOLUTION

FIELD

Embodiments of the present disclosure relate generally to image encoding and decoding techniques, and more particularly, to image/video super resolution.

BACKGROUND

Super Resolution (SR) is a process of recovering a High Resolution (HR) image/video from a corresponding Low Resolution (LR) counterpart. SR has been widely employed in various computer vision tasks, such as security surveillance, medical photography. With the rapid development of machine learning, SR algorithms based on machine learning is studied extensively. A typical approach regarding the construction of the HR image/video is by learning the non-linear mapping from LR to HR with deep convolutional neural networks (CNN).

SUMMARY

Embodiments of the present disclosure provide a solution for image/video super resolution.

In a first aspect, a method for image processing is proposed. The method comprises: receiving a first image with a first resolution and at least one reference image associated with the first image, the first image and the at least one reference image being associated with a same video; determining a difference between the first image and the at least one reference image; and generating a second image with a second resolution based on the difference, the first image and the at least one reference image, the second resolution being higher than the first resolution. The method in accordance with the present disclosure takes a scene-cut, a local mutation or a compression distortion into consideration during the image processing. Compared with the conventional methods, the proposed method advantageously enables an improved super resolution for both natural scene videos and screen content videos.

In a second aspect, an electronic device is proposed. The electronic device comprises: a processing unit; and a memory coupled to the processing unit and having instructions stored thereon which, when executed by the processing unit, cause the electronic device to perform a method in accordance with the first aspect of the present disclosure.

In a third aspect, a non-transitory computer-readable storage medium is proposed. The non-transitory computer-readable storage medium storing instructions that cause a processor to perform a method in accordance with the first aspect of the present disclosure.

In a fourth aspect, a non-transitory computer-readable recording medium is proposed. The non-transitory computer-readable recording medium storing a bitstream of a video which is generated by a method in accordance with the first aspect of the present disclosure, wherein the method is performed by a video processing apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
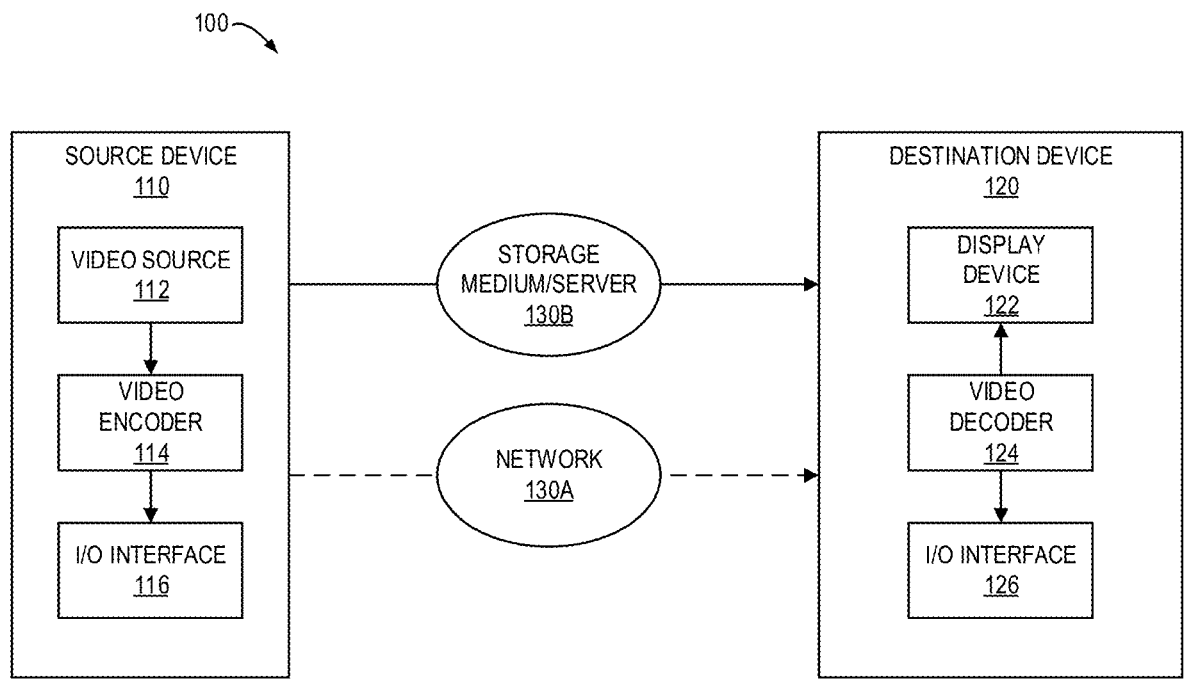
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which be configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
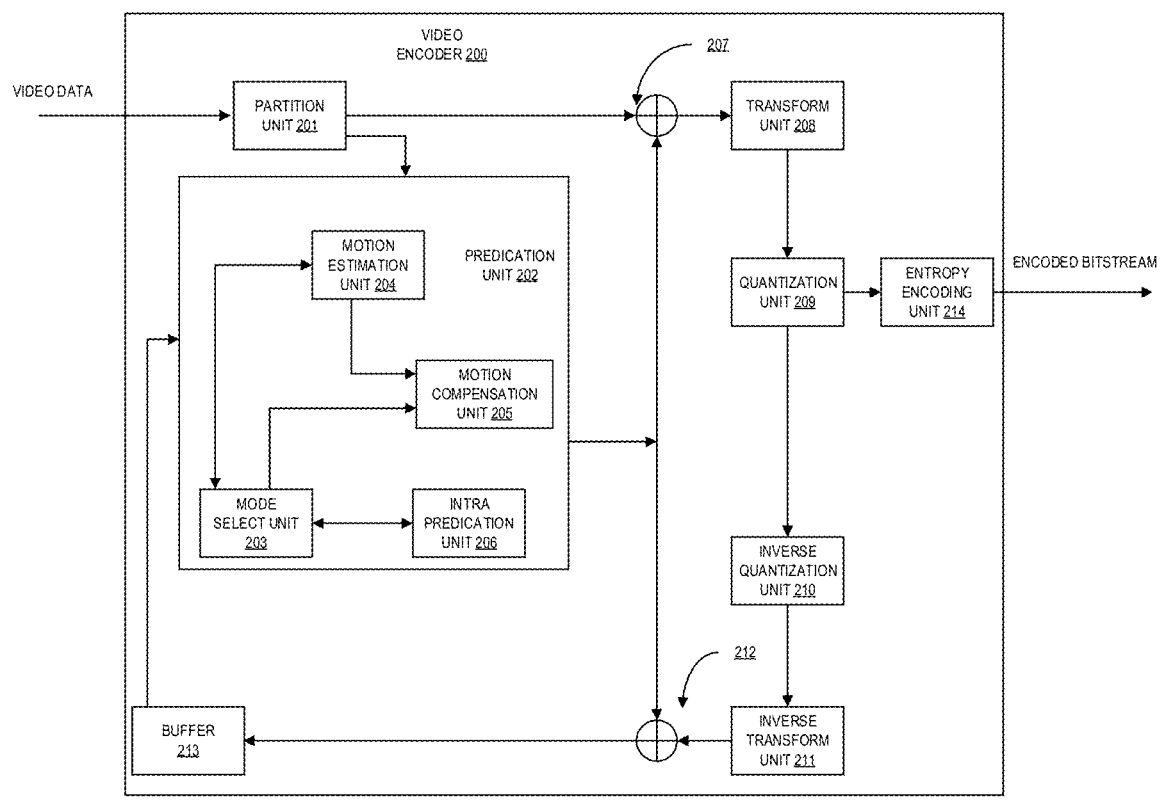
FIG. 2 illustrates a block diagram that illustrates a first example video encoder, in accordance with some embodiments of the present disclosure.

FIG. 2 is a block diagram illustrating an example of video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some example, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed reduce video blocking artifacts in the video block.

The entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 3:
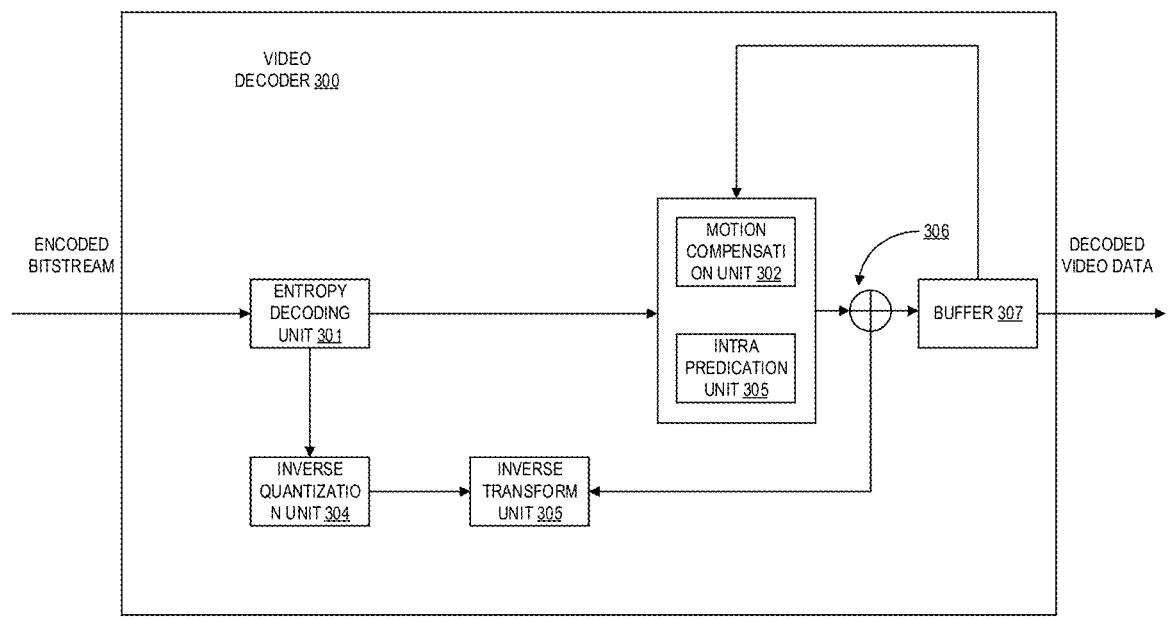
FIG. 3 illustrates a block diagram that illustrates an example video decoder, in accordance with some embodiments of the present disclosure.

FIG. 3 is a block diagram illustrating an example of video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200 (FIG. 2).

The entropy decoding unit 301 may retrieve an encoded bitstream. The encoded bitstream may include entropy coded video data (e.g., encoded blocks of video data). The Entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by video encoder 20 during encoding of the video block to calculate interpolated values for sub-integer pixels of a reference block. The motion compensation unit 302 may determine the interpolation filters used by video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 303 inverse quantizes, i.e., de-quantizes, the quantized video block coefficients provided in the bitstream and decoded by entropy decoding unit 301. Inverse transform unit 303 applies an inverse transform.

The reconstruction unit 306 may obtain the decoded blocks, e.g., by sum the residual blocks with the corresponding prediction blocks generated by motion compensation unit 202 or intra-prediction unit 303. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Some exemplary embodiments of the present disclosure will be described in detailed hereinafter. It should be noted that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

SUMMARY

The invention is related to image/video processing technologies. Specifically, it is about algorithm design for video super-resolution. The ideas may be applied individually or in various combination, to any image/video super-resolution system or part of video coding and decoding process.

BACKGROUND

Figure 4:
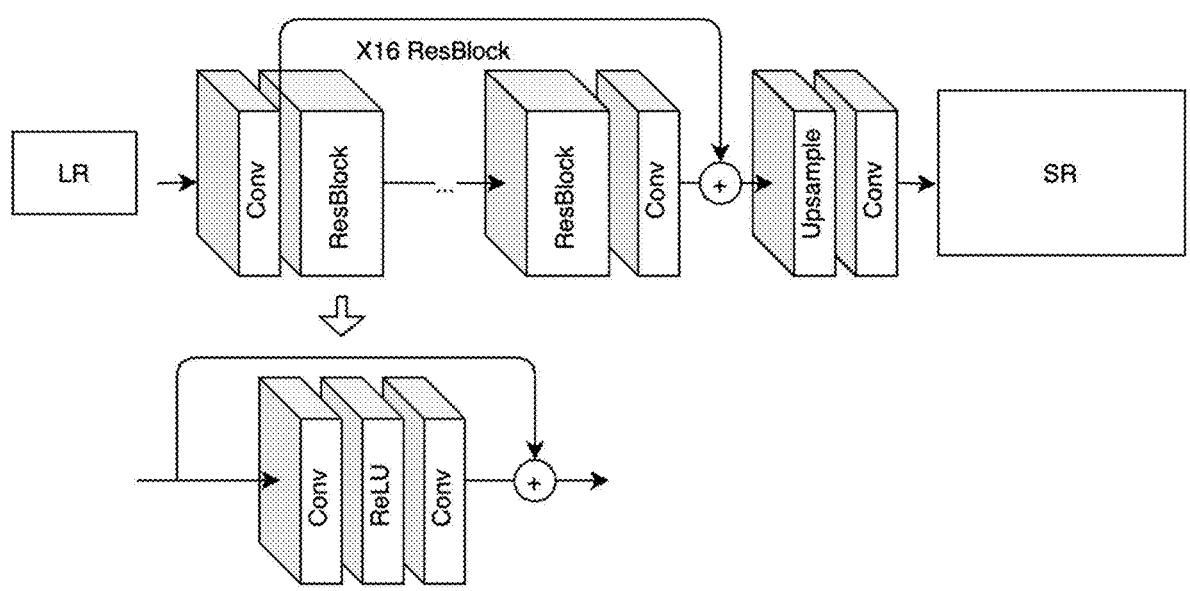
FIG. 4 illustrates an enhanced deep super-resolution network (EDSR) baseline network.

Super-resolution (SR) targets at recovering a High-Resolution (HR) image/video from the associated Low-Resolution (LR) one, which is recognized as an ill-posed problem. SR has been widely employed in various computer vision tasks, such as security surveillance, medical photography. Currently, a typical approach regarding the construction of the HR image/video is by learning the non-linear mapping from LR to HR with deep convolutional neural networks (CNN). CNN-based SR methods significantly surpass the conventional SR methods. In particular, the neural network could formulate a series of low-level feature maps from the input LR image/video, approaching the genuine HR by cumulating and reorganizing the features. In the literature, Dong et al. (Dong, C., Loy, C. C., He, K., Tang, X.: Learning a deep convolutional network for image super-resolution. In: ECCV. (2014)) proposed the Super-Resolution Convolutional Neural Network (SRCNN) containing three convolutional layers, which is the first CNN based SR scheme for image SR. Moreover, Kim et al. (Kim, J., Kwon Lee, J., Mu Lee, K.: Deeply-recursive convolutional network for image super-resolution. In: CVPR. (2016)) explores the connections between the network depths and SR performance where the network depth is increased to 20, leading to prominent improvement compared with SRCNN. Lim et al. (Lim, B., Son, S., Kim, H., Nah, S., Lee, K. M.: Enhanced deep residual networks for single image super-resolution. In: CVPRW. (2017)) proposed the Enhanced Deep Super-Resolution network (EDSR) and Multi-scale Deep Super-Resolution system (MDSR) wherein a modified residual net (ResNet) (He, K., Zhang, X., Ren, S., Sun, J.: Deep residual learning for image recognition. In: CVPR. (2016)) is employed, as illustrated in FIG. 4, making the training of the very deep and very wide network became possible. Zhang et al. (Zhang Y, Li K, Li K, et al. Image super-resolution using very deep residual channel attention networks[C]//Proceedings of the European Conference on Computer Vision (ECCV). 2018: 286-301) suggests involving the attention mechanism into the SR network with which the feature channels can be adaptively rescaled, boosting the representation ability of the network. Regarding video SR, the temporal dependencies among adjacent LR frames could serve as useful information for the SR of the current LR. More specifically, the optical flow (Jose Caballero, Christian Ledig, Andrew Aitken, Alejandro Acosta, Johannes Totz, Zehan Wang, and Wenzhe Shi. 2017. Real-time video super-resolution with spatio-temporal networks and motion compensation. In Proceedings of the IEEE Conference on Computer Vision and Pattern Recognition. 4778-4787) (Longguang Wang, Yulan Guo, Zaiping Lin, Xinpu Deng, and Wei An. 2018. Learning for video super-resolution through HR optical flow estimation. In Asian Conference on Computer Vision. Springer, 514-529) among the consecutive frames, reflecting the motion and changing, is repetitively employed for frame alignment. This requires frame preprocessing and is computational expensive. The SR quality highly relies on the accuracies of the optical flow estimation. The temporal dependencies can also be characterized in an intrinsic manner where a recursive neural network was employed in Yan Huang, Wei Wang, and Liang Wang. 2015. Bidirectional recurrent con-volutional networks for multi-frame super-resolution. In Advances in Neural Information Processing Systems. 235-243, and Mehdi SM Sajjadi, Ravitej a Vemulapalli, and Matthew Brown. 2018. Frame-recurrent video super-resolution. In Proceedings of the IEEE Conference on Computer Vision and Pattern Recognition. 6626-6634 to extract the contextual information among different frames. Tian et al. (Yapeng Tian, Yulun Zhang, Yun Fu, and Chenliang Xu TDAN. 2018. Temporally deformable alignment network for video super-resolution. arXiv preprint arXiv:1812.02898 1, 2 (2018), 3) proposed a deformable convolution module to achieve the feature level alignment. Yi et al. (Peng Yi, Zhongyuan Wang, Kui Jiang, Junjun Jiang, and Jiayi Ma. 2019. Progressive Fusion Video Super-Resolution Network via Exploiting Non-Local Spatio-Temporal Correlations. In Proceedings of the IEEE International Conference on Computer Vision. 3106-3115) employed a progressive fusion network with non-local attention to extract the dependencies of consecutive frames.

PROBLEMS

Existing methods for video SR have the following problems:
(1) Existing methods are designed for the SR of the natural scene videos, which may fail to learn the inverse representation of screen content videos. Specifically, the raw screen content videos may possess sharp edges, high contrast textures, and noiseless contents. By contrast, the natural scene contents are relatively smooth with additive sensor noises. Moreover, the temporal motions of the objects in screen content may also distinct from the natural scene videos. The motions in natural scene videos are mainly composed with the translation and affine motion. Screen contents are rendered by computer where absolute static scene, zooming, rotation and scene-switch may frequently occur in inter-frames, hindering the application of the existing SR model.
(2) Existing methods employ consecutive adjacent frames as input without considering the scene-cut or local mutation. The highly diversified contents may deviate the representation of the current frame in the model learning process.
(3) Existing methods focus on the raw video data. However, in real application scenario such as the spatial scalable coding, bandwidth-limited transmission, and reference picture resampling coding, only the compressed LR videos are available. The compression distortion may interference the learning of the SR model.

INVENTION

To solve the above problems and some other problems not mentioned, methods as summarized below are disclosed. The detailed inventions below should be considered as examples to explain general concepts. These inventions should not be interpreted in a narrow way. Furthermore, these inventions can be combined in any manner.

In the following descriptions, the term 'super-resolution (SR)' may represent any variance of signal processing methods that derive the rescaled or reconstructed signal of the current counterpart. The input images/videos include but not limited to the screen content and natural content.

To solve the problem (1), (2) and (3), one or more of the following approaches are disclosed:
1. Directly involve samples of the current low-resolution frame $LR_i$ and associated reference frames $LR_j$ in the SR model.
   a) In one example, the reference frames may be the neighboring forward M frames and/or neighboring backward N frames (i.e. $j \in [i+M, i-N]$) in the display order.
   b) In one example, the reference frames may be the reconstructed frames contaminated with compression distortions from the neighboring forward M frames and/or neighboring backward N frames (i.e. $j \in [i+M, i-N]$).
   c) In one example, at least two reference frames are not the adjacent ones.
   d) In one example, M and N are set to 0 and 1, respectively.
   e) In one example, the reference frames may be the genuine reference frames of the current frame collected from the reference list in the context of video coding.
   f) In one example, the reference frames may be the medium outcomes during the compression of the current frame, such as the spatial-domain residual frame, frequency-domain residual frame, prediction frame, motion map, partitioning information map, block vector information map, the palette prediction table.
2. Utilize temporarily derived sample values in the SR model wherein the derived sample values are based on the current low-resolution frame $LR_i$ and associated reference frames $LR_j$
   a) In one example, a temporarily derived sample value at location (x, y) may be defined as $f(LR_i(x, y), LR_j(x, y))$ wherein f(*) is a linear or non-linear function.
      i. In one example, it may be defined as:

$$\text{temp}(x,y) = |a \cdot LR_i(x,y) - b \cdot LR_j(x,y) + c|$$

ii. Alternatively, it may be defined as:

$$\text{temp}(x,y) = (a \cdot LR_i(x,y) - b \cdot LR_j(x,y) + c)^2$$

iii. In above examples, the $LR_j(x, y)$ may be replaced by $LR_j(x', y')$ wherein (x', y') is the corresponding sample location of (x, y) at reference picture with index equal to j.
        1) In one example, at least one of the two x'!=x, y'!=y is true.
        2) In one example, (x', y') may be depend on the reference picture index or reference picture location.
        3) In one example, (x', y') may be depend on the motion estimation results, e.g., using the optical flow method.
        4) Alternatively, furthermore, the $LR_j(x, y)$ may be replaced by $LR_i(x', y')$ wherein (x', y') is the corresponding sample location of (x, y) at current picture. (x', y') may be depend on the block vector searching results, e.g., the decoded block vectors.

iv. In above examples, a and b are two variables which may represent the weighting factors applied to the current low-resolution frame and reference frames. c is an offset.

b) In one example, involve a distance $d_i$ of the current low-resolution frame $LR_i$ in the SR model which is based on the temporarily derived sample values and/or number of reference frames.
  i. In one example, $d_i$ may depend on the temporarily derived sample values for all coordinates within a video unit (e.g., a picture).
  ii. Alternatively, $d_i$ may depend on the temporarily derived sample values for representative coordinates instead of all within a video unit (e.g., a picture).

c) In one example, the distance $d_i$ is derived according to a linear function of the temporarily derived sample values.
  i. In one example, the distance $d_i$ is calculated by the average of all temporarily derived sample values.
  ii. In one example, the distance $d_i$ is calculated by the average of the T lowest temporarily derived sample values.

d) In one example, the distance $d_i$ is derived according to a non-linear function of the temporarily derived sample values, e.g., the exponential function.
  i. In one example, it may be defined using the following equation:

$$d_i = \frac{\sum_{j=i-N}^{i+M} \sum_{x=1}^{w} \sum_{y=1}^{h} temp(x,y)^p}{f \cdot (M+N) \cdot s \cdot (w+h)},$$

where M and N are the number of the input neighboring frames forward and backward of the current frame, respectively. j is the reference index that should not equal to i. p, s and f are positive numbers. (x, y) are the sample coordinates. w and h represent the sample numbers in horizontal and vertical directions, respectively.

ii. In one example, it may be defined using the following equation:

$$d_i = \frac{\sum_{j=i-N}^{i+M} temp(x,y)^p}{f \cdot (M+N)},$$

where M and N are the number of the input neighboring frames forward and backward of the current frame, respectively. j is the reference index that should not equal to i. p and f are positive numbers. (x, y) are the sample coordinates.

iii. In one example, it may be defined using the following equation:

$$d_i = \frac{\sum_{j=i-N}^{i+M} \sum_{x=1}^{w} \sum_{y=1}^{h} e^{-temp(x,y)^p}}{f \cdot (M+N) \cdot s \cdot (w+h)},$$

iv. In one example, it may be defined using the following equation:

$$d_i = \frac{\sum_{j=i-N}^{i+M} e^{-temp(x,y)^p}}{f \cdot (M+N)},$$

v. In one example, the distance $d_i$ is derived using the following equation:

$$d_i = \left( \prod_{j=i-N}^{i+M} e^{-temp(x,y)^p} \right)^{\frac{1}{f(M+N)}},$$

vi. In one example, the distance $d_i$ is derived using the following equation:

$$d_i = \left( \prod_{j=i-N}^{i+M} \frac{\sum_{x=1}^{w} \sum_{y=1}^{h} e^{-temp(x,y)^p}}{s \cdot (w+h)} \right)^{\frac{1}{f(M+N)}},$$

e) In one example, the current low-resolution frame $LR_i$ and reference frames $LR_j$ may be raw data without compression contamination.
  i. In one example, the three-color channels (e.g., YUV, RGB) may be employed for deriving temp (x, y) and/or $d_i$.
  ii. Alternatively, the current low-resolution frame $LR_i$ and neighboring reference frames $LR_j$ may employ single color channel for deriving temp(x, y) and/or $d_i$.
  iii. Alternatively, temp(x,y) may be the derived by the mean of temp(x,y) associated with three channels.
  iv. Alternatively, temp(x,y) may be the derived by the weighted average of temp(x, y) associated with three channels.
  v. In one example, sample values of $LR_i$ and/or $LR_j$ may be firstly normalized according to the bit-depth before being utilized to derive the temp (x, y).

f) In above examples, the variable M, and N are the number of the input neighboring frames forward and backward of the current frame, respectively. j is the reference index that should not be equal to i. p, s and f are positive numbers. a and b are two variables which may represent the weighting factors applied to the current low-resolution frame and reference frames. c is an offset. w and h represent the sample numbers in horizontal and vertical directions, respectively.
  i. In one example, N is equal to 1.
  ii. In one example, M is equal to 0.
  iii. In one example, f is equal to 1.
  iv. In one example, a and/or b are equal to 1.
  v. In one example, c equal to 0.
  vi. In one example, p is equal to 2.
  vii. In one example, M or N is within the range of [1, F], where in F is an integer value. f is equal to $$\frac{1}{M+N}.$$

viii. In one example, s equals to $$\frac{1}{w \times h}.$$

3. The distances $d_i$ may be directly concatenated with the feature maps of $LR_i$ and $LR_j$.
   a) Alternatively, the distances $d_i$ may be processed by one or several convolutional layers, generating the distance feature maps. The distance feature maps may be directly concatenated with the feature maps of $LR_i$ and $LR_j$.
      i. In one example, the feature maps of the distances $d_i$ are generated by one or several convolutional layers.
      ii. In one example, the feature maps of the distances $d_i$ are generated by residual convolutional network (ResNet).
      iii. In one example, the feature maps of the distances $d_i$ are generated by residual channel attention network (RCAN).
      iv. In one example, the feature maps of the distances $d_i$ are generated by residual dense network (RDN).
      v. In one example, the feature maps of the distances $d_i$ are generated by recurrent neural network (RNN).
      vi. In one example, the feature maps of the distances $d_i$ are generated by deep back-projection network (DBPN).
   b) In the above examples, the feature maps of $LR_i$ and $LR_j$ are generated by one or several convolutional layers.
      i. Alternatively, the feature maps of $LR_i$ and $LR_j$ are separately generated by different convolutional layers.
      ii. In one example, the feature maps of $LR_i$ and $LR_j$ are generated by residual convolutional network (ResNet).
      iii. In one example, the feature maps of $LR_i$ and $LR_j$ are generated by residual channel attention network (RCAN).
      iv. In one example, the feature maps of $LR_i$ and $LR_j$ are generated by residual dense network (RDN).
      v. In one example, the feature maps of $LR_i$ and $LR_j$ are generated by recurrent neural network (RNN).
      vi. In one example, the feature maps of $LR_i$ and $LR_j$ are generated by deep back-projection network (DBPN).
4. Multiple-stage SR solution is proposed wherein an output of one SR image in one stage may be further refined by another stage.
   a) In one example, the first training stage and second training stage may utilize different inputs.
      i. In one example, the inputs of a second stage may be part of the inputs used in a first stage.
      ii. In one example, the inputs of a second stage may utilize the outputs of a first stage.
         1) In one example, the high resolution of current image may be used as an input to the second stage.
   b) In one example, an adaptive two-stage training scheme is proposed to enhance the recovery of the high-resolution image/video.
      1) In one example, the first training stage is processed by default, generating a temporary $S_i^1$, $$SR_i^1 = S(HR_i, LR_i, LR_j, \theta_1),$$

where S(*) is the re-sampling function and $\theta_1$ denotes the model parameter set.
      2) In one example, the second training stage only absorbs the images/patches from $LR_j$ that are similar to the collocated image/patches in $LR_i$, denoted by $LR_k$ as inputs, yielding the $SR_i^2$, $$SR_i^2 = S(HR_i', LR_i, LR_k, \theta_2),$$

where $LR_k$ are selected training data from those used in the first pass. $HR_i'$ denotes the associated high-resolution benchmark.
         1. In one example, the similarity of two images/patches is defined as the sum of the absolute differences.
         2. In one example, the similarity of two images/patches is defined as the mean of the absolute differences.
         3. In one example, the similarity of two images/patches is defined as the sum of the square differences.
         4. In one example, the similarity of two images/patches is evaluated with the structural similarity index metric (SSIM), e.g., $S_{ssim}(LR_k, LR_i)$.
         5. In one example, the similarity of two images/patches is evaluated with multi-scale structural similarity index metric (MS-SSIM), e.g., $S_{ms\text{-}ssim}(LR_k, LR_i)$.
         6. In one example, the similarity of two images/patches is evaluated with the sharpness similarity, $$S_{sharp}(LR_k, LR_i) = \frac{2 \cdot E(LR_k) \cdot E(LR_i) + c_2}{E(LR_k)^2 + E(LR_i)^2 + c_2},$$

where $c_2$ is a decimal to avoid the denominator being zero. In one example, E(X) can be calculated as follows, $$E(X) = |X \cdot h_1| + |X \cdot h_0|,$$

where $h_o$ and $h_1$ are two most prominent directions of the sharpness/edge filters given the filter set.
            i. In one example, the filter set could be sobel filters.
            ii. In one example, the filter set could be canny filters.
         7. In one example, the similarity of two images/patches is evaluated with the weighted sum of the sharpness similarity and structural similarity.
         8. In above examples, the similarity judgement may be conducted with three color channels or single-color channel.
      3) In one example, the second training stage only absorbs the images/patches from $LR_j$ that are similar to the collocated image/patches in $LR_i$ as input, yielding the $SR_i^2$, $$SR_i^2 = S(HR_i', LR_i', LR_j', \theta_2),$$

where $LR_i'$, $LR_j'$ are selected training data (e.g., samples at selected coordinates) from $LR_i$ and $LR_j$. $HR_i'$ denotes the associated high-resolution benchmark.

1. In one example, the similarity of two images/patches is defined as the sum of the absolute differences.
2. In one example, the similarity of two images/patches is defined as the mean of the absolute differences.
3. In one example, the similarity of two images/patches is defined as the sum of the square differences.
4. In one example, the similarity of two images/patches is evaluated with the structural similarity index metric (SSIM), $S_{ssim}(LR_k, LR_i)$.
5. In one example, the similarity of two images/patches is evaluated with multi-scale structural similarity index metric (MS-SSIM), $S_{ms\text{-}ssim}(LR_k, LR_i)$.
6. In one example, the similarity of two images/patches is evaluated with the sharpness similarity, $$S_{sharp}(LR_k, LR_i) = \frac{2 \cdot E(LR_k) \cdot E(LR_i) + c_2}{E(LR_k)^2 + E(LR_i)^2 + c_2},$$

where $c_2$ is a decimal to avoid the denominator being zero. In one example, E(X) can be calculated as follows, $$E(X) = |X \cdot h_1| + |X \cdot h_0|,$$

where $h_0$ and $h_1$ are two most prominent directions of the sharpness/edge filters given the filter set.
  i. In one example, the filter set could be sobel filters.
  ii. In one example, the filter set could be canny filters.
7. In one example, the similarity of two images/patches is evaluated with the weighted sum of the sharpness similarity and structural similarity.
8. In above examples, the similarity judgement may be conducted with three color channels or single-color channel.
4) Alternatively, furthermore, the loss function of frame i of the second stage can be described as, $$L_i = A \cdot |SR_i^1 - HR_i|^p + B \cdot |SR_i^2 - HR_i|^q + C.$$

5. The proposed methods may be applied as post-processing wherein a first refined image after the SR being applied is not used to predict/coding/decoding a second image in LR.
6. The proposed methods may be applied as in-loop-processing wherein for a video unit in a first image in LR may be refined with the SR method wherein the refined video unit is utilized to code the proceeding video units in the first image and/or other images.
  i. In one example, the video unit could be a CB/PB/TB/CU/PU/TU/CTB/CTU/a region covering multiple CTUs/slice/subpicture/tile/picture.
7. Whether to and/or how to apply the proposed methods may be signaled in the bitstream.
8. Whether to and/or how to apply the proposed methods may be dependent on the color component, and/or decoded information.
  a) In one example, the proposed methods may be applied to certain color component (e.g., luma only), or all color components.
  b) In one example, for each color component, the above methods may be applied to derive the corresponding SR results for the given color component.
  c) In one example, different color component may use different methods for SR.

EMBODIMENTS

Examples of super-resolution process are illustrated as follows. The distances between the current low resolution frame and the neighboring low resolution frame are involved to guide the recovery of the high-resolution counterparts. The inputs could be color pictures/frames/videos with three channels (e.g. RGB, YUV) or single channel picures/frames/videos.

5.1. Embodiment #1

In this embodiment, only one neighboring low-resolution frame $LR_{i-1}$ is involved as reference. The inputs are color videos with three channels (RGB). The distance between $LR_{i-1}$ and $LR_i$ with respect to each individual channel can be derived as follows, $$d_i^R(x,y) = e^{-|LR_i^R(x,y) - LR_{i-1}^R(x,y)|^2},$$

$$d_i^G(x,y) = e^{-|LR_i^G(x,y) - LR_{i-1}^G(x,y)|^2},$$

$$d_i^B(x,y) = e^{-|LR_i^B(x,y) - LR_{i-1}^B(x,y)|^2},$$

$$d_i = \{d_i^R, d_i^G, d_i^B\},$$

where (x, y) represents the sample coordinates within the current picture/frame.

Figure 5:
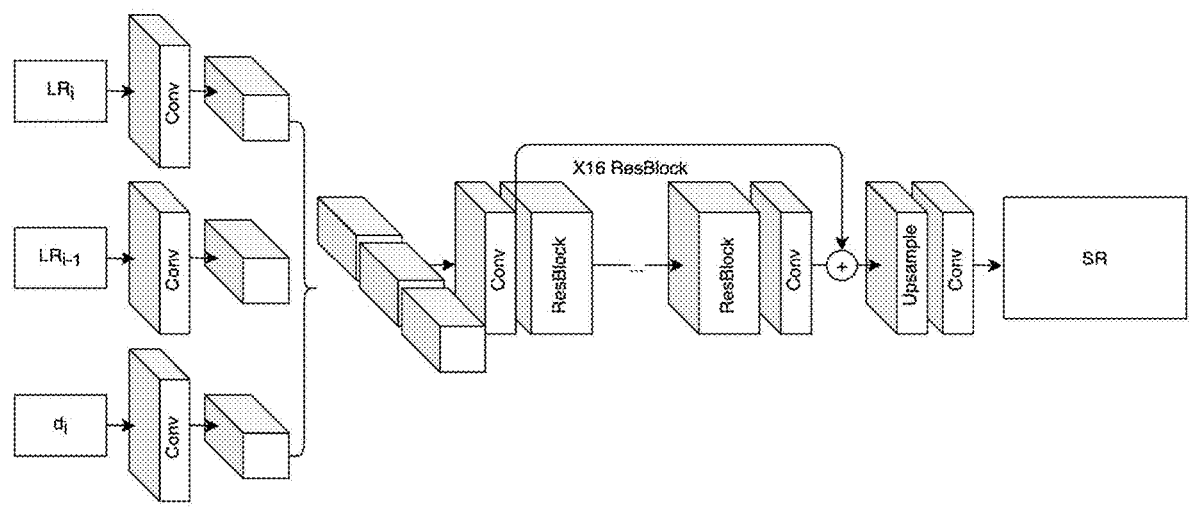
FIG. 5 illustrates a framework of a network in accordance with some embodiments of the present disclosure.

The framework of the network is illustrated in FIG. 5. In particular, the first convolutional layer is a designed for feature extraction wherein the kernal size is 3×3, yielding 64 feature maps of $LR_i$, 64 feature maps of $LR_{i-1}$ and 64 feature maps of $d_i$. Subsequently, the feature maps are concatenated, feading into the residual neural network for the learning of the high-resolution representation. L1 loss is employed as the loss function.

5.2. Embodiment #2

In this embodiment, only one neighboring low-resolution frame $LR_{i-1}$ is involved as reference. The inputs are color videos with three channels (RGB). The distance between $LR_{i-1}$ and $LR_i$ with respect to each individual channel can be derived as follows, $$d_i^R(x,y) = e^{-|LR_i^R(x,y) - LR_{i-1}^R(x,y)|^2},$$

$$d_i^G(x,y) = e^{-|LR_i^G(x,y) - LR_{i-1}^G(x,y)|^2},$$

$$d_i^B(x,y) = e^{-|LR_i^B(x,y) - LR_{i-1}^B(x,y)|^2},$$

$$d_i = \{d_i^R, d_i^G, d_i^B\},$$

where (x, y) represents the sample coordinates within the current picture/frame.

Figure 6:
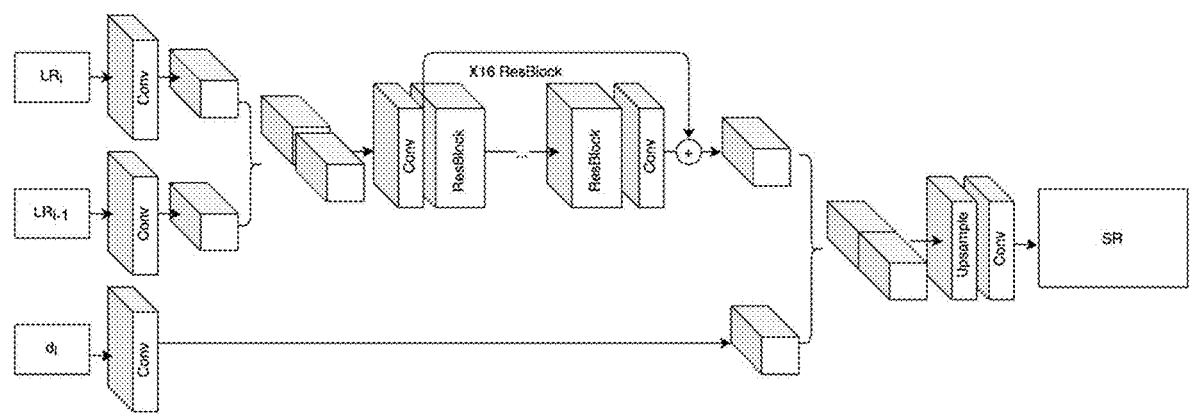
FIG. 6 illustrates a framework of a network in accordance with some embodiments of the present disclosure.

The framework of the network is illustrated in FIG. 6. In particular, the first convolutional layer is a designed for feature extraction wherein the kernal size is 3×3, yielding 64 feature maps of $LR_i$, 64 feature maps of $LR_{i-1}$ and 64 feature maps of $d_i$. Subsequently, the feature maps of $LR_{i-1}$ and $LR_i$ are concatenated, feading into the residual neural network for the learning of the high-resolution representation. The feature maps of the distance is concantenated with the output of the residual network before upsampling. Mean square error (MSE) is employed as the loss function.

5.3. Embodiment #3

In this embodiment, only one neighboring low-resolution frame $LR_{i-1}$ is involved as reference.

The inputs are color videos with three channels (RGB). The distance between $LR_{i-1}$ and $LR_i$ with respect to each individual channel can be derived as follows, $$d_i^R(x,y)=e^{-|LR_i^R(x,y)-LR_{i-1}^R(x,y)|^2},$$

$$d_i^G(x,y)=e^{-|LR_i^G(x,y)-LR_{i-1}^G(x,y)|^2},$$

$$d_i^B(x,y)=e^{-|LR_i^B(x,y)-LR_{i-1}^B(x,y)|^2},$$

$$d_i=\{d_i^R, d_i^G, d_i^B\},$$

where (x, y) represents the sample coordinates within the current picture/frame.

Figure 7:
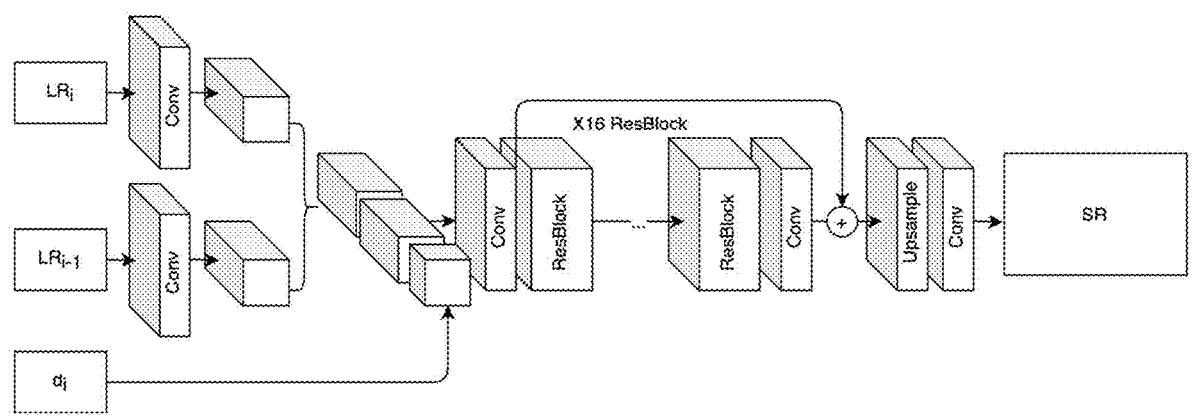
FIG. 7 illustrates a framework of a network in accordance with some embodiments of the present disclosure.

The framework of the network is illustrated in FIG. 7. In particluar, the first convolutional layer is a designed for feature extraction wherein the kernal size is 3×3, yielding 64 feature maps of $LR_i$, 64 feature maps of $LR_{i-1}$. Subsequently, the feature maps of $LR_{i-1}$ and $LR_i$, and the $d_i$ (3 channels) are concatenated, feeding into the residual neural network for the learning of the high-resolution representation. L1 loss is employed as the loss function.

5.4. Embodiment #4

In this embodiment, only one neighboring low-resolution frame $LR_{i-1}$ is involved as reference.

The inputs are color videos with three channels (RGB). The distance between $LR_{i-1}$ and $LR_i$ with respect to each individual channel can be derived as follows, $$d_i^R(x,y)=e^{-|LR_i^R(x,y)-LR_{i-1}^R(x,y)|^2},$$

$$d_i^G(x,y)=e^{-|LR_i^G(x,y)-LR_{i-1}^G(x,y)|^2},$$

$$d_i^B(x,y)=e^{-|LR_i^B(x,y)-LR_{i-1}^B(x,y)|^2},$$

$$d_i=\{d_i^R, d_i^G, d_i^B\},$$

where (x, y) represents the sample coordinates within the current picture/frame.

Figure 8:
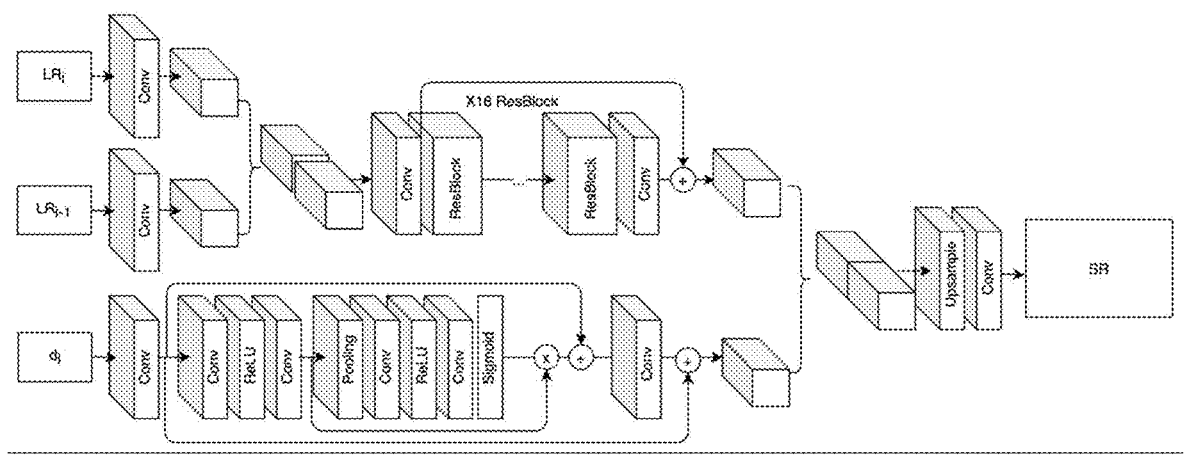
FIG. 8 illustrates a framework of a network in accordance with some embodiments of the present disclosure.

The framework of the network is illustrated in FIG. 8. In particular, the first convolutional layer is a designed for feature extraction wherein the kernal size is 3×3, yielding 64 feature maps of $LR_i$, 64 feature maps of $LR_{i-1}$. Subsequently, the feature maps of $LR_{i-1}$ and $LR_i$ are concatenated, feeding into the residual neural network. The distance map $d_i$ is processed by a residual attention block. L2 loss is employed as the loss function.

As discussed above, FIG. 5 illustrates a framework of Embodiment #1; FIG. 6 illustrates a framework of Embodiment #2; FIG. 7 illustrates a framework of Embodiment #3; and FIG. 8 illustrates a framework of Embodiment #4.

Figure 9:
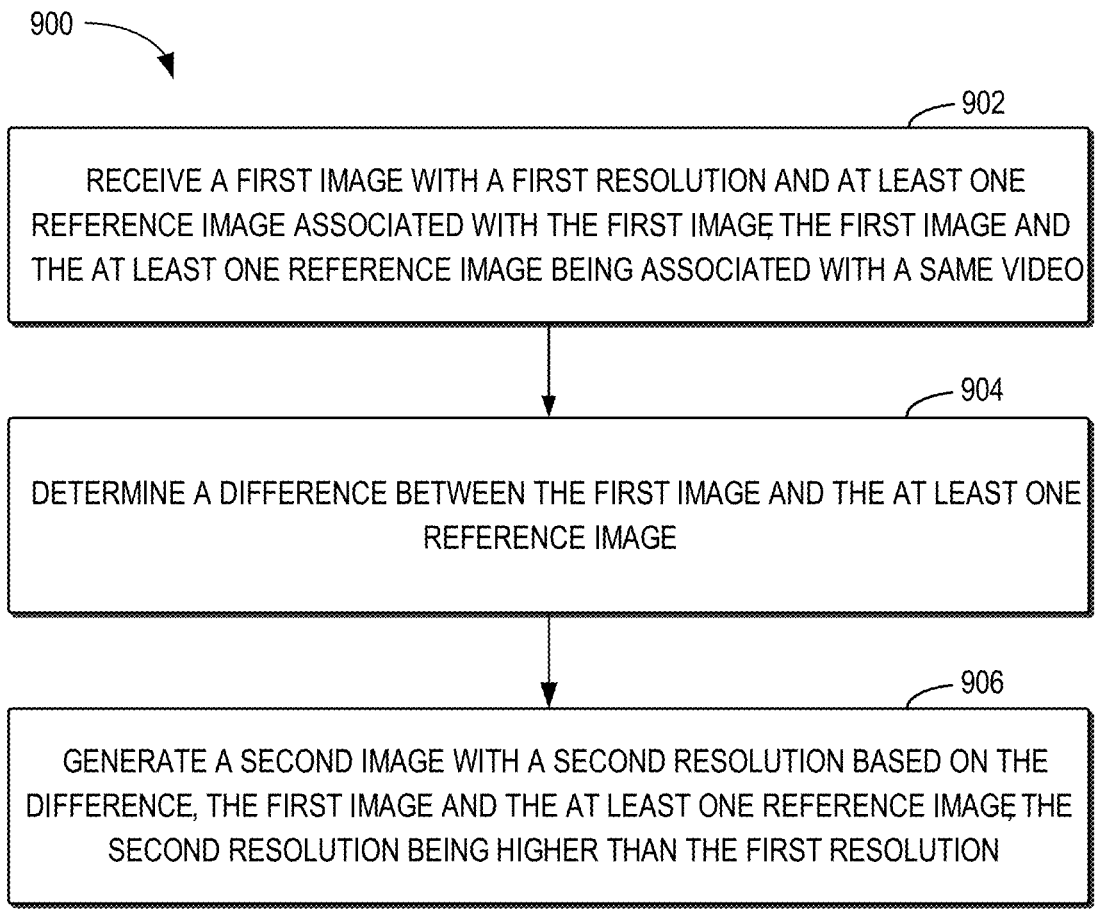
FIG. 9 illustrates a flowchart of a method for image processing in accordance with some embodiments of the present disclosure.

FIG. 9 illustrates a flowchart of a method 900 for image processing in accordance with some embodiments of the present disclosure. The method 900 comprises receiving 902 a first image with a first resolution and at least one reference image associated with the first image, the first image and the at least one reference image being associated with a same video; determining 904 a difference between the first image and the at least one reference image; and generating 906 a second image with a second resolution based on the difference, the first image and the at least one reference image, the second resolution being higher than the first resolution. The method 900 in accordance with the present disclosure can consider a scene-cut, a local mutation or a compression distortion during the image processing. Compared with the conventional methods, the proposed method 900 advantageously enables an improved super resolution for both natural scene videos and screen content videos.

In some embodiments, the first image may be a coding block (CB). In some embodiments, the first image may be a prediction block (PB). In some embodiments, the first image may be a transform block (TB). In some embodiments, the first image may be a coding unit (CU). In some embodiments, the first image may be a prediction unit (PU). In some embodiments, the first image may be a transform unit (TU). In some embodiments, the first image may be a coding tree block (CTB). In some embodiments, the first image may be a coding tree unit (CTU). In some embodiments, the first image may be a region covering multiple CTUs. In some embodiments, the first image may be a slice. In some embodiments, the first image may be a subpicture. In some embodiments, the first image may be a tile. In some embodiments, the first image may be a picture. It should be noted that the possible implementation of the first image described here are merely illustrative and therefore should not be construed as limiting the present disclosure in any way.

In some embodiments, the at least one reference image may comprise at least one of: a first set of forward images immediately preceding the first image in a display order, or a second set of backward images immediately following the first image in the display order.

In some embodiments, the at least one reference image may comprise reconstructed images with compression distortion from at least one of: a first set of forward images immediately preceding the first image in a display order, or a second set of backward images immediately following the first image in the display order.

In some embodiments, the at least one reference image may comprise reconstructed images with compression distortion from at least one of: a first set of forward images immediately preceding the first image in a decoding order, or a second set of backward images immediately following the first image in the decoding order.

In some embodiments, the at least one reference image may comprise a plurality of reference images, and at least two of the plurality of reference images are not adjacent to each other.

In some embodiments, the number of forward images in the first set of forward images may be equal to 0, and the number of backward images in the second set of backward images may be equal to 1.

In some embodiments, the first image may comprise a first frame in the video, and the at least one reference image may comprise a reference frame used as a reference for coding the first frame.

In some embodiments, the at least one reference image may comprise an intermediate result generated during a compression of the first image.

In some embodiments, the intermediate result may be a spatial-domain residual frame. In some embodiments, the intermediate result may be a frequency-domain residual frame. In some embodiments, the intermediate result may be a prediction frame. In some embodiments, the intermediate result may be a motion map. In some embodiments, the intermediate result may be a partitioning information map. In some embodiments, the intermediate result may be a block vector information map. In some embodiments, the intermediate result may be a palette prediction table.

In some embodiments, the difference may be determined based on at least one temporarily derived sample value, and wherein the temporarily derived sample value may be derived based on a first sample value of the first image at a first location and a second sample value of the reference image at a second location. In aid of such a difference, the proposed method enables the detection of a scene-cut and a local mutation, so as to improve the super resolution for highly diversified contents.

In some embodiments, the second location may be identical to the first location, and the temporarily derived sample value may be calculated by:

$$temp(x,y) = |a \cdot LR_i(x,y) - b \cdot LR_j(x,y) + c|,$$

where temp (x, y) represents the temporarily derived sample value at the first location (x, y), |•| represents an absolute value function, $LR_i$(x, y) represents the first sample value of the first image at the first location (x, y), $LR_j$(x, y) represents the second sample value of the reference image at the first location (x, y), a and b represent weighting factors applied to the first image and the reference image, respectively, and c represents an offset. In aid of such a temporarily derived sample value, the proposed method can advantageously detect the difference between two images at a same location, which enables the detection of a scene-cut and a local mutation, so as to improve the super resolution for highly diversified contents.

In some embodiments, the second location may be identical to the first location, and the temporarily derived sample value may be calculated by:

$$temp(x,y) = (a \cdot LR_i(x,y) - b \cdot LR_j(x,y) + c)^2,$$

where temp (x, y) represents the temporarily derived sample value at the first location (x, y), y) represents the first sample value of the first image at the first location (x, y), $LR_j$(x, y) represents the second sample value of the reference image at the first location (x, y), a and b represent weighting factors applied to the first image and the reference image, respectively, and c represents an offset. In aid of such a temporarily derived sample value, the proposed method can advantageously detect the difference between two images at a same location, which enables the detection of a scene-cut and a local mutation, so as to improve the super resolution for highly diversified contents.

In some embodiments, the proposed method may be applied in the inter prediction. In some embodiments, the first image may comprise a first frame in the video, the at least one reference image may comprise a reference frame in the video, and the second location may be a corresponding sample location of the first location at the reference frame used to code the first image. In some embodiments, the second location may be different from the first location. In some embodiments, the second location may depend on an index of the reference frame or a location of the reference frame. In some embodiments, the second location may depend on a result of a motion estimation. In some embodiments, the motion estimation may be based on an optical flow method.

In some embodiments, the proposed method may be applied in the intra prediction. In some embodiments, the first image may comprise a first video unit in a frame in the video, the at least one reference image may comprise a reference video unit in the frame, and the second location is a corresponding sample location of the first location at the frame used to code the first video unit. In some embodiments, the second location may depend on a result of a block vector searching. In some embodiments, the result of the block vector searching may comprise a decoded block vector.

In some embodiments, the difference may be determined based on the number of the at least one reference images. In some embodiments, the difference may be determined based on the at least one temporarily derived sample value and the number of the at least one reference images. In some embodiments, the difference may depend on the temporarily derived sample values for all coordinates within the first image. In some embodiments, the difference may depend on the temporarily derived sample values for representative coordinates within the first image.

In some embodiments, the difference may be determined based on a linear function of the temporarily derived sample value. In some embodiments, the difference may be determined by averaging at least part of the temporarily derived sample values. In some embodiments, the difference may be determined by averaging all of the temporarily derived sample values. In some embodiments, the difference may be determined by averaging T lowest temporarily derived sample values, where T represents an positive integer.

In some embodiments, the difference may be determined based on a non-linear function of the temporarily derived sample value. In some embodiments, the difference may be determined based on an exponential function of the temporarily derived sample value.

In some embodiments, the difference may be calculated by:

$$d_i = \frac{\sum_{j=i-N}^{i+M} \sum_{x=1}^{w} \sum_{y=1}^{h} temp(x, y)^p}{f \cdot (M+N) \cdot s \cdot (w+h)},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p, s and f represent a positive number, respectively; w and h represent the sample numbers in horizontal and vertical directions, respectively; and temp (x, y) represents the temporarily derived sample value at the first location (x, y).

In some embodiments, the difference may be calculated by:

$$d_i = \frac{\sum_{j=i-N}^{i+M} temp(x, y)^p}{f \cdot (M+N)},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p and f represent a positive number, respectively; and temp (x, y) represents the temporarily derived sample value at the first location (x, y).

In some embodiments, the difference may be calculated by:

$$d_i = \frac{\sum_{j=i-N}^{i+M} \sum_{x=1}^{w} \sum_{y=1}^{h} e^{-temp(x,y)^p}}{f \cdot (M+N) \cdot s \cdot (w+h)},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p, s and f represent a positive number, respectively; w and h represent the sample numbers in horizontal and vertical directions, respectively; and temp (x, y) represents the temporarily derived sample value at the first location (x, y).

In some embodiments, the difference may be calculated by:

$$d_i = \frac{\sum_{j=i-N}^{i+M} e^{-temp(x,y)^p}}{f \cdot (M+N)},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p and f represent a positive number, respectively; and temp (x, y) represents the temporarily derived sample value at the first location (x, y).

In some embodiments, the difference may be calculated by:

$$d_i = \left( \prod_{j=i-N}^{i+M} e^{-temp(x,y)^p} \right)^{\frac{1}{f(M+N)}},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p and f represent a positive number, respectively; and temp (x, y) represents the temporarily derived sample value at the first location (x, y).

In some embodiments, the difference may be calculated by:

$$d_i = \left( \prod_{j=i-N}^{i+M} \frac{\sum_{x=1}^{w} \sum_{y=1}^{h} e^{-temp(x,y)^p}}{s \cdot (w+h)} \right)^{\frac{1}{f(M+N)}},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p, s and f represent a positive number, respectively; w and h represent the sample numbers in horizontal and vertical directions, respectively; and temp (x, y) represents the temporarily derived sample value at the first location (x, y).

In some embodiments, N is equal to 1. In some embodiments, M is equal to 0. In some embodiments, f is equal to 1. In some embodiments, at least one of a or b is equal to 1. In some embodiments, c is equal to 0. In some embodiments, p is equal to 2. In some embodiments, f is equal to $$\frac{1}{M+N},$$

and M or N is in the range of 1 to F, where F represents an integer. In some embodiments, s is equal to $$\frac{1}{w \times h}.$$

In some embodiments, the first image and the at least one reference image may be raw data without compression distortions. In some embodiments, the difference may be determined by using three color channels. In some embodiments, the three color channels may be YUV or RGB. In some embodiments, the difference may be determined by using single color channel. In some embodiments, the temporarily derived sample value may be derived based on a mean of temporarily derived sample values associated with three color channels. In some embodiments, the temporarily derived sample value may be derived based on a weighted average of temporarily derived sample values associated with three color channels. In some embodiments, sample values of the first image and the at least one reference image is normalized according to a bit-depth before being used to derive the temporarily derived sample value.

In some embodiments, generating 906 the second image may comprise: concatenating the difference directly with a first feature map and at least one reference feature map to obtain a concatenated feature map, the first feature map being associated with the first image and the at least one reference feature map being associated with the at least one reference image; and generating the second image based on the concatenated feature map using a machine learning model.

In some embodiments, generating 906 the second image may comprise: concatenating a difference feature map with a first feature map and at least one reference feature map to obtain a concatenated feature map, the difference feature map being associated with the difference, the first feature map being associated with the first image and the at least one reference feature map being associated with the at least one reference image; and generating the second image based on the concatenated feature map using a machine learning model.

In some embodiments, the difference feature map is generated based on the difference by one convolutional layer (Conv). In some embodiments, the difference feature map is generated based on the difference by a plurality of convolutional layers. In some embodiments, the difference feature map is generated based on the difference by a residual convolutional network (ResNet). In some embodiments, the difference feature map is generated based on the difference by a residual channel attention network (RCAN). In some embodiments, the difference feature map is generated based on the difference by a residual dense network (RDN). In some embodiments, the difference feature map is generated based on the difference by a recurrent neural network (RNN). In some embodiments, the difference feature map is generated based on the difference by a deep back-projection network (DBPN).

In some embodiments, the first feature map and the at least one reference feature map are generated based on the first image and the at least one reference image by one convolutional layer. In some embodiments, the first feature map and the at least one reference feature map are generated based on the first image and the at least one reference image by a plurality of convolutional layers. In some embodiments, the first feature map and the at least one reference feature map are generated based on the first image and the at least one reference image by a residual convolutional network (ResNet). In some embodiments, the first feature map and the at least one reference feature map are generated based on the first image and the at least one reference image by a residual channel attention network (RCAN). In some embodiments, the first feature map and the at least one reference feature map are generated based on the first image and the at least one reference image by a residual dense network (RDN). In some embodiments, the first feature map and the at least one reference feature map are generated based on the first image and the at least one reference image by a recurrent neural network (RNN). In some embodiments, the first feature map and the at least one reference feature map are generated based on the first image and the at least one reference image by a deep back-projection network (DBPN). In some embodiments, the first feature map and the at least one reference feature map are generated based on the first image and the at least one reference image by different convolutional layers separately.

In some embodiments, a network for machine learning may include a convolution layer (Conv). In some embodiments, a network for machine learning may include a residual attention block (ResBlock). In some embodiments, a network for machine learning may include an upsampling (Upsample). In some embodiments, a network for machine learning may include a pooling layer (Pooling). In some embodiments, a network for machine learning may include a rectified linear unit (ReLU). In some embodiments, a network for machine learning may include an S function, also known as a Sigmoid function.

In some embodiments, generating 906 the second image may comprise: generating the second image using a machine learning model, the machine learning model being trained with a multi-stage method, wherein an output of a first training stage is refined by a second training stage. In aid of this configuration, the method in accordance with the present disclosure is able to generate a SR image with improved quality.

In some embodiments, an input of the first training stage is different from an input of the second training stage. In some embodiments, the input of the second training stage may comprise the output of the first training stage. In some embodiments, the input of the second training stage may comprise a high resolution version of the first image.

In some embodiments, generating 906 the second image may comprise: generating the second image using a machine learning model, the machine learning model being trained with a multi-stage method, wherein a loss function used in a second training stage is based on an output of a first training stage. In aid of this configuration, the method in accordance with the present disclosure is able to generate a SR image with improved quality.

In some embodiments, the loss function may be calculated by:

$$L_i = A \cdot |SR_i^1 - HR_i|^p + B \cdot |SR_i^2 - HR_i'|^q + C,$$

where $L_i$ represents the loss function associated with the first image with an index i; $|\cdot|$ represents an absolute value function; $SR_i^1$ represents the output of the first training stage; $HR_i$ represents a high-resolution benchmark used in the first training stage; $SR_i^2$ represents an output of the second training stage; $HR_i'$ represents the high-resolution benchmark used in the second training stage; A and B represent positive numbers; p and q are greater than or equal to 1; and C represents an offset.

In some embodiments, the output of the first training stage is generated based on a first set of reference images and the output of the second training stage is generated based on a second set of reference images, wherein the second set of reference images are selected from the first set of reference images based on a similarity between the reference image and the first image.

In some embodiments, the similarity between the reference image and the first image may be determined based on a sum of absolute differences between the reference image and the first image. In some embodiments, the similarity between the reference image and the first image may be determined based on a mean of the absolute differences. In some embodiments, the similarity between the reference image and the first image may be determined based on a sum of square differences between the reference image and the first image. In some embodiments, the similarity between the reference image and the first image may be determined based on a structural similarity index metric (SSIM). In some embodiments, the similarity between the reference image and the first image may be determined based on a multi-scale structural similarity index metric (MS-SSIM). In some embodiments, the similarity between the reference image and the first image may be determined based on a sharpness similarity. In some embodiments, the similarity between the reference image and the first image may be determined based on a weighted sum of the sharpness similarity and the structural similarity. It should be noted that the metrics used to define the similarity described here are merely illustrative and therefore should not be construed as limiting the present disclosure in any way.

In some embodiments, the sharpness similarity may be calculated by:

$$S_{sharp}(LR_k, LR_i) = \frac{2 \cdot E(LR_k) \cdot E(LR_i) + c_2}{E(LR_k)^2 + E(LR_i)^2 + c_2},$$

where $S_{sharp}(LR_k, LR_i)$ represents the sharpness similarity between the reference image $LR_k$ and the first image $LR_i$; $c_2$ represents a positive decimal; and $E(X)$ may be calculated by:

$$E(X) = |X \cdot h_1| + |X \cdot h_0|,$$

where $h_0$ and $h_1$ represent two most prominent directions of sharpness or edge filters given a filter set. In some embodiments, the filter set may comprise sobel filters. In some embodiments, the filter set may comprise canny filters. It should be noted that E(X) represents the main sharpness strength and can be calculated in any other suitable manner.

In some embodiments, the similarity between the reference image and the first image may be determined by using three color channels or single color channel.

In some embodiments, the output of the first training stage is generated based on a first set of reference images and the output of the second training stage is generated based on a second set of reference images, wherein the second set of reference images are selected from a third set of reference images based on a similarity between the reference image and the first image, the third set of reference images being different from the first set of reference images In some embodiments, the similarity between the reference image and the first image may be determined based on a sum of absolute differences between the reference image and the first image. In some embodiments, the similarity between the reference image and the first image may be determined based on a mean of the absolute differences. In some embodiments, the similarity between the reference image and the first image may be determined based on a sum of square differences between the reference image and the first image. In some embodiments, the similarity between the reference image and the first image may be determined based on a structural similarity index metric (SSIM). In some embodiments, the similarity between the reference image and the first image may be determined based on a multi-scale structural similarity index metric (MS-SSIM). In some embodiments, the similarity between the reference image and the first image may be determined based on a sharpness similarity. In some embodiments, the similarity between the reference image and the first image may be determined based on a weighted sum of the sharpness similarity and the structural similarity. It should be noted that the metrics used to define the similarity described here are illustrative and therefore should not be construed as limiting the present disclosure in any way.

In some embodiments, the sharpness similarity may be calculated by:

$$S_{sharp}(LR_k, LR_i) = \frac{2 \cdot E(LR_k) \cdot E(LR_i) + c_2}{E(LR_k)^2 + E(LR_i)^2 + c_2},$$

where $S_{sharp}(LR_k, LR_i)$ represents the sharpness similarity between the reference image $LR_k$ and the first image $LR_i$; $c_2$ represents a positive decimal; and E(X) may be calculated by:

$$E(X) = |X \cdot h_1| + |X \cdot h_0|,$$

where $h_0$ and $h_1$ represent two most prominent directions of sharpness or edge filters given a filter set. In some embodiments, the filter set may comprise sobel filters. In some embodiments, the filter set may comprise canny filters. It should be noted that E(X) represents the main sharpness strength and can be calculated in any other suitable manner.

In some embodiments, the similarity between the reference image and the first image may be determined by using three color channels or single color channel.

In some embodiments, a prediction, coding and decoding of a third image with the first resolution may be independent of the second image.

In some embodiments, the proposed method 900 may further comprise: coding a third image with the first reso-lution by using the second image. By way of example, the second image can be used as a reference image for coding the third image.

In some embodiments, receiving 902 the first image and the at least one reference image may comprise: decoding a flag from a bitstream; and in response to the flag indicating a first value, receiving the first image and the at least one reference image.

In some embodiments, the first image may comprise one color component. In some embodiments, the color component is a luma component. In some embodiments, the color component is a chroma component.

In some embodiments, the first image may comprise a first color component and a second color component different from the first color component, the second image may comprise three color components, and generating 906 the second image may comprise: generating a first intermediate result based on the first color component of the first image; generating a second intermediate result based on the second color component of the first image; generating the second image based on the first intermedia result and the second intermediate result. In some embodiments, the first intermediate result and the second intermediate result are generated by using different methods for super resolution.

Implementations of the disclosure can be described in view of the following clauses, the features of which can be combined in any reasonable manner.

Clause 1. A method for image processing, comprising:
receiving a first image with a first resolution and at least one reference image associated with the first image, the first image and the at least one reference image being associated with a same video;
determining a difference between the first image and the at least one reference image; and
generating a second image with a second resolution based on the difference, the first image and the at least one reference image, the second resolution being higher than the first resolution.

Clause 2. The method of Clause 1, wherein the at least one reference image comprises at least one of:
a first set of forward images immediately preceding the first image in a display order, or
a second set of backward images immediately following the first image in the display order.

Clause 3. The method of Clause 1, wherein the at least one reference image comprises reconstructed images with compression distortion from at least one of:
a first set of forward images immediately preceding the first image in a display order, or
a second set of backward images immediately following the first image in the display order.

Clause 4. The method of Clause 1, wherein the at least one reference image comprises reconstructed images with compression distortion from at least one of:
a first set of forward images immediately preceding the first image in a decoding order, or
a second set of backward images immediately following the first image in the decoding order.

Clause 5. The method of Clause 1, wherein the at least one reference image comprises a plurality of reference images, and at least two of the plurality of reference images are not adjacent to each other.

Clause 6. The method of any of Clauses 2-4, wherein the number of forward images in the first set of forward images is equal to 0, and the number of backward images in the second set of backward images is equal to 1.

Clause 7. The method of Clause 1, wherein the first image comprises a first frame in the video, and the at least one reference image comprises a reference frame used as a reference for coding the first frame.

Clause 8. The method of Clause 1, wherein the at least one reference image comprises an intermediate result generated during a compression of the first image.

Clause 9. The method of Clause 8, wherein the intermediate result is one of: a spatial-domain residual frame, a frequency-domain residual frame, a prediction frame, a motion map, a partitioning information map, a block vector information map or a palette prediction table.

Clause 10. The method of Clause 1, wherein the difference is determined based on at least one temporarily derived sample value, and wherein the temporarily derived sample value is derived based on a first sample value of the first image at a first location and a second sample value of the reference image at a second location.

Clause 11. The method of Clause 10, wherein the second location is identical to the first location, and the temporarily derived sample value is calculated by:

$$\text{temp}(x,y) = |a \cdot LR_i(x,y) - b \cdot LR_j(x,y) + c|,$$

where temp (x, y) represents the temporarily derived sample value at the first location (x, y), |•| represents an absolute value function, $LR_i(x, y)$ represents the first sample value of the first image at the first location (x, y), $LR_j(x,y)$ represents the second sample value of the reference image at the first location (x, y), a and b represent weighting factors applied to the first image and the reference image, respectively, and c represents an offset.

Clause 12. The method of Clause 10, wherein the second location is identical to the first location, and the temporarily derived sample value is calculated by:

$$\text{temp}(x,y) = (a \cdot LR_i(x,y) - b \cdot LR_j(x,y) + c)^2,$$

where temp (x, y) represents the temporarily derived sample value at the first location (x, y), y) represents the first sample value of the first image at the first location (x, y), $LR_j(x, y)$ represents the second sample value of the reference image at the first location (x, y), a and b represent weighting factors applied to the first image and the reference image, respectively, and c represents an offset.

Clause 13. The method of Clause 10, wherein the first image comprises a first frame in the video, the at least one reference image comprises a reference frame in the video, and the second location is a corresponding sample location of the first location at the reference frame used to code the first image.

Clause 14. The method of Clause 13, wherein the second location is different from the first location.

Clause 15. The method of Clause 13, wherein the second location depends on an index of the reference frame or a location of the reference frame.

Clause 16. The method of Clause 13, wherein the second location depends on a result of a motion estimation.

Clause 17. The method of Clause 16, wherein the motion estimation is based on an optical flow method.

Clause 18. The method of Clause 10, wherein the first image comprises a first video unit in a frame in the video, the at least one reference image comprises a reference video unit in the frame, and the second location is a corresponding sample location of the first location at the frame used to code the first video unit.

Clause 19. The method of Clause 18, wherein the second location depends on a result of a block vector searching.

Clause 20. The method of Clause 19, wherein the result of the block vector searching comprises a decoded block vector.

Clause 21. The method of Clause 1, wherein the difference is determined based on the number of the at least one reference images.

Clause 22. The method of Clause 10, wherein the difference is determined based on the at least one temporarily derived sample value and the number of the at least one reference images.

Clause 23. The method of Clause 10, wherein the difference depends on the temporarily derived sample values for all coordinates within the first image.

Clause 24. The method of Clause 10, wherein the difference depends on the temporarily derived sample values for representative coordinates within the first image.

Clause 25. The method of Clause 10, wherein the difference is determined based on a linear function of the temporarily derived sample value.

Clause 26. The method of Clause 25, wherein the difference is determined by averaging at least part of the temporarily derived sample values.

Clause 27. The method of Clause 25, wherein the difference is determined by averaging T lowest temporarily derived sample values, where T represents an positive integer.

Clause 28. The method of Clause 10, wherein the difference is determined based on a non-linear function of the temporarily derived sample value.

Clause 29. The method of Clause 10, wherein the difference is determined based on an exponential function of the temporarily derived sample value.

Clause 30. The method of Clause 28, wherein the difference is calculated by:

$$d_i = \frac{\sum_{j=i-N}^{i+M} \sum_{x=1}^{w} \sum_{y=1}^{h} \text{temp}(x,y)^p}{f \cdot (M+N) \cdot s \cdot (w+h)},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p, s and f represent a positive number, respectively; w and h represent the sample numbers in horizontal and vertical directions, respectively; and temp (x, y) represents the temporarily derived sample value at the first location (x, y).

Clause 31. The method of Clause 28, wherein the difference is calculated by:

$$d_i = \frac{\sum_{j=i-N}^{i+M} \text{temp}(x,y)^p}{f \cdot (M+N)},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p and f represent a positive number, respectively; and temp (x, y) represents the temporarily derived sample value at the first location (x, y).

Clause 32. The method of Clause 28, wherein the difference is calculated by:

$$d_i = \frac{\sum_{j=i-N}^{i+M} \sum_{x=1}^{w} \sum_{y=1}^{h} e^{-temp(x,y)^p}}{f \cdot (M+N) \cdot s \cdot (w+h)},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p, s and f represent a positive number, respectively; w and h represent the sample numbers in horizontal and vertical directions, respectively; and temp (x, y) represents the temporarily derived sample value at the first location (x, y).

Clause 33. The method of Clause 28, wherein the difference is calculated by:

$$d_i = \frac{\sum_{j=i-N}^{i+M} e^{-temp(x,y)^p}}{f \cdot (M+N)},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p and f represent a positive number, respectively; and temp (x, y) represents the temporarily derived sample value at the first location (x, y).

Clause 34. The method of Clause 28, wherein the difference is calculated by:

$$d_i = \left(\prod_{j=i-N}^{i+M} e^{-temp(x,y)^p}\right)^{\frac{1}{f(M+N)}},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p and f represent a positive number, respectively; and temp (x, y) represents the temporarily derived sample value at the first location (x, y).

Clause 35. The method of Clause 28, wherein the difference is calculated by:

$$d_i = \left(\prod_{j=i-N}^{i+M} \frac{\sum_{x=1}^{w} \sum_{y=1}^{h} e^{-temp(x,y)^p}}{s \cdot (w+h)}\right)^{\frac{1}{f(M+N)}},$$

where i represents an index of the first image; $d_i$ represents the difference associated with the first image with the index i; M represents the number of the reference images immediately preceding the first image in a display order or in a decoding order; N represents the number of the reference images immediately following the first image in the display order or in the decoding order; j represents a reference index and is not equal to i; p, s and f represent a positive number, respectively; w and h represent the sample numbers in horizontal and vertical directions, respectively; and temp (x, y) represents the temporarily derived sample value at the first location (x, y).

Clause 36. The method of Clause 10, wherein the first image and the at least one reference image are raw data without compression distortions.

Clause 37. The method of Clause 36, wherein the difference is determined by using three color channels.

Clause 38. The method of Clause 36, wherein the difference is determined by using single color channel.

Clause 39. The method of Clause 36, wherein the temporarily derived sample value is derived based on a mean of temporarily derived sample values associated with three color channels.

Clause 40. The method of Clause 36, wherein the temporarily derived sample value is derived based on a weighted average of temporarily derived sample values associated with three color channels.

Clause 41. The method of Clause 36, wherein sample values of the first image and the at least one reference image is normalized according to a bit-depth before being used to derive the temporarily derived sample value.

Clause 42. The method of any of Clauses 30-35, wherein,
N is equal to 1;
M is equal to 0;
f is equal to 1;
at least one of a orb is equal to 1;
c is equal to 0;
p is equal to 2;
f is equal to $$\frac{1}{M+N},$$

and M or N is in the range of 1 to F, where F represents an integer; or
s is equal to $$\frac{1}{w \times h}.$$

Clause 43. The method of Clause 1, wherein generating the second image comprises:
concatenating the difference directly with a first feature map and at least one reference feature map to obtain a concatenated feature map, the first feature map being associated with the first image and the at least one reference feature map being associated with the at least one reference image; and
generating the second image based on the concatenated feature map using a machine learning model.

Clause 44. The method of Clause 1, wherein generating the second image comprises:
concatenating a difference feature map with a first feature map and at least one reference feature map to obtain a concatenated feature map, the difference feature map being associated with the difference, the first feature map being associated with the first image and the at least one reference feature map being associated with the at least one reference image; and generating the second image based on the concatenated feature map using a machine learning model.

Clause 45. The method of Clause 44, wherein the difference feature map is generated based on the difference by one of:
one convolutional layer;
a plurality of convolutional layers;
a residual convolutional network (ResNet);
a residual channel attention network (RCAN);
a residual dense network (RDN);
a recurrent neural network (RNN); or
a deep back-projection network (DBPN).

Clause 46. The method of Clause 43 or 44, wherein the first feature map and the at least one reference feature map are generated based on the first image and the at least one reference image by one of:
one convolutional layer;
a plurality of convolutional layers;
a residual convolutional network (ResNet);
a residual channel attention network (RCAN);
a residual dense network (RDN);
a recurrent neural network (RNN); or
a deep back-projection network (DBPN).

Clause 47. The method of Clause 43 or 44, wherein the first feature map and the at least one reference feature map are generated based on the first image and the at least one reference image by different convolutional layers separately.

Clause 48. The method of Clause 1, wherein generating the second image comprises:
generating the second image using a machine learning model, the machine learning model being trained with a multi-stage method, wherein an output of a first training stage is refined by a second training stage.

Clause 49. The method of Clause 48, wherein an input of the first training stage is different from an input of the second training stage.

Clause 50. The method of Clause 49, wherein the input of the second training stage comprises the output of the first training stage.

Clause 51. The method of Clause 50, wherein the input of the second training stage comprises a high resolution version of the first image.

Clause 52. The method of Clause 1, wherein generating the second image comprises:
generating the second image using a machine learning model, the machine learning model being trained with a multi-stage method, wherein a loss function used in a second training stage is determined based on an output of a first training stage.

Clause 53. The method of Clause 52, wherein the loss function is calculated by:

$$L_i = A \cdot |SR_i^1 - HR_i|^p + B \cdot |SR_i^2 - HR'_i|^q + C,$$

where $L_i$ represents the loss function associated with the first image with an index i; $|\cdot|$ represents an absolute value function; $SR_i^1$ represents the output of the first training stage; $HR_i$ represents a high-resolution benchmark used in the first training stage; $SR_i^2$ represents an output of the second training stage; $HR'_i$ represents the high-resolution benchmark used in the second training stage; A and B represent positive numbers; p and q are greater than or equal to 1; and C represents an offset.

Clause 54. The method of Clause 53, wherein the output of the first training stage is generated based on a first set of reference images and the output of the second training stage is generated based on a second set of reference images, wherein the second set of reference images are selected from the first set of reference images based on a similarity between the reference image and the first image.

Clause 55. The method of Clause 54, wherein the similarity between the reference image and the first image is determined based on one of:
a sum of absolute differences between the reference image and the first image;
a mean of the absolute differences;
a sum of square differences between the reference image and the first image;
a structural similarity index metric (SSIM);
a multi-scale structural similarity index metric (MS-SSIM);
a sharpness similarity; or
a weighted sum of the sharpness similarity and the structural similarity.

Clause 56. The method of Clause 55, wherein the sharpness similarity is calculated by:

$$S_{sharp}(LR_k, LR_i) = \frac{2 \cdot E(LR_k) \cdot E(LR_i) + c_2}{E(LR_k)^2 + E(LR_i)^2 + c_2},$$

where $S_{sharp}(LR_k, LR_i)$ represents the sharpness similarity between the reference image $LR_k$ and the first image $LR_i$; $c_2$ represents a positive decimal; and $E(X)$ is calculated by:

$$E(X) = |X \cdot h_1| + |X \cdot h_0|,$$

where $h_0$ and $h_1$ represent two most prominent directions of sharpness or edge filters given a filter set.

Clause 57. The method of Clause 56, wherein the filter set comprises sobel filters or wherein the filer set comprises canny filters.

Clause 58. The method of Clause 54, wherein the similarity between the reference image and the first image is determined by using three color channels or single color channel.

Clause 59. The method of Clause 53, wherein the output of the first training stage is generated based on a first set of reference images and the output of the second training stage is generated based on a second set of reference images, wherein the second set of reference images are selected from a third set of reference images based on a similarity between the reference image and the first image, the third set of reference images being different from the first set of reference images.

Clause 60. The method of Clause 59, wherein the similarity between the reference image and the first image is determined based on one of:
a sum of an absolute difference between the reference image and the first image;
a mean of the absolute difference;
a sum of a square difference between the reference image and the first image;
a structural similarity index metric (SSIM);
a multi-scale structural similarity index metric (MS-SSIM);
a sharpness similarity; or
a weighted sum of the sharpness similarity and the structural similarity.

Clause 61. The method of Clause 60, wherein the sharpness similarity is calculated by:

$$S_{sharp}(LR_k, LR_i) = \frac{2 \cdot E(LR_k) \cdot E(LR_i) + c_2}{E(LR_k)^2 + E(LR_i)^2 + c_2},$$

where $S_{sharp}$ ($LR_k$, $LR_i$) represents the sharpness similarity between the reference image $LR_k$ and the first image $LR_i$; $c_2$ represents a positive decimal; and E(X) is calculated by:

$$E(X) = |X \cdot h_1| + |X \cdot h_0|,$$

where $h_0$ and $h_1$ represent two most prominent directions of sharpness or edge filters given a filter set.

Clause 62. The method of Clause 61, wherein the filter set comprises sobel filters or wherein the filer set comprises canny filters.

Clause 63. The method of Clause 59, wherein the similarity between the reference image and the first image is determined by using three color channels or single color channel.

Clause 64. The method of Clause 1, wherein a prediction, coding and decoding of a third image with the first resolution is independent of the second image.

Clause 65. The method of Clause 1, further comprising:
coding a third image with the first resolution by using the second image.

Clause 66. The method of Clause 1, wherein the first image is one of:
a coding block (CB),
a prediction block (PB),
a transform block (TB),
a coding unit (CU),
a prediction unit (PU),
a transform unit (TU),
a coding tree block (CTB),
a coding tree unit (CTU),
a region covering multiple CTUs,
a slice,
a subpicture,
a tile, or
a picture.

Clause 67. The method of Clause 1, wherein receiving the first image and the at least one reference image comprises:
decoding a flag from a bitstream; and
in response to the flag indicating a first value, receiving the first image and the at least one reference image.

Clause 68. The method of Clause 1, wherein the first image comprises one color component.

Clause 69. The method of Clause 68, wherein the color component is a luma component or a chroma component.

Clause 70. The method of Clause 1, wherein the first image comprises a first color component and a second color component different from the first color component, the second image comprises three color components, and generating the second image comprises:
generating a first intermediate result based on the first color component of the first image;
generating a second intermediate result based on the second color component of the first image;
generating the second image based on the first intermedia result and the second intermediate result.

Clause 71. The method of Clause 70, wherein the first intermediate result and the second intermediate result are generated by using different methods for super resolution.

Clause 72. An electronic device, comprising:
a processing unit; and
a memory coupled to the processing unit and having instructions stored thereon which, when executed by the processing unit, cause the electronic device to perform a method in accordance with any of Clauses 1-71.

Clause 73. A non-transitory computer-readable storage medium storing instructions that cause a processor to perform a method in accordance with any of Clauses 1-71.

Clause 74. A non-transitory computer-readable recording medium storing a bitstream of a video which is generated by a method in accordance with any of Clauses 1-71, wherein the method is performed by a video processing apparatus.

Example Device

Figure 10:
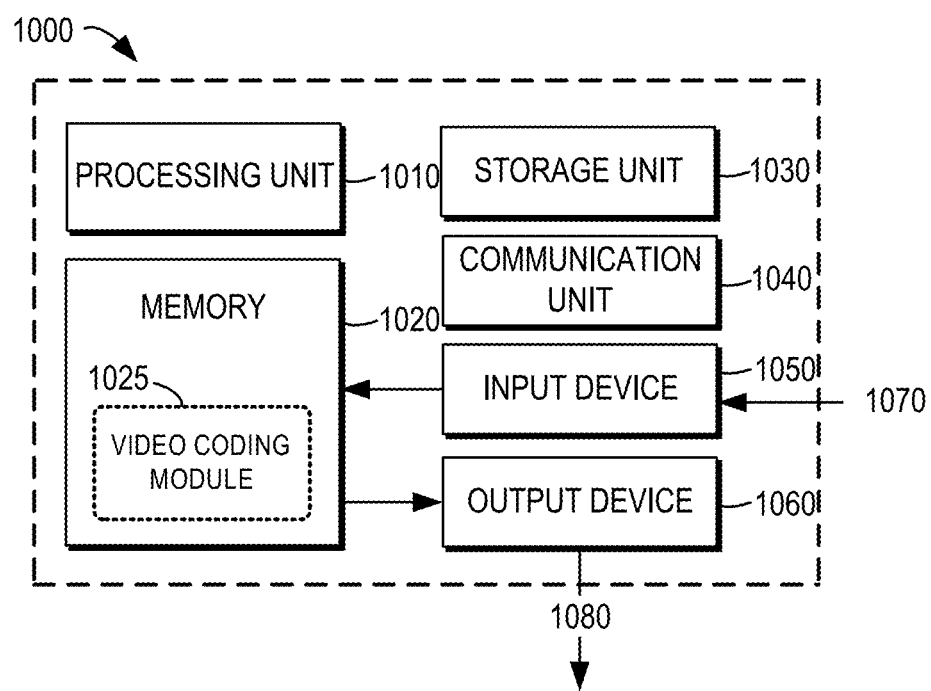
FIG. 10 illustrates a block diagram of an electronics device in which various embodiments of the present disclosure can be implemented.

FIG. 10 illustrates a block diagram of a computing device 1000 in which various embodiments of the present disclosure can be implemented. The computing device 1000 may be implemented as or included in the source device 110 (or the video encoder 114 or 200) or the destination device 120 (or the video decoder 124 or 300).

It would be appreciated that the computing device 1000 shown in FIG. 10 is merely for purpose of illustration, without suggesting any limitation to the functions and scopes of the embodiments of the present disclosure in any manner.

As shown in FIG. 10, the computing device 1000 includes a general-purpose computing device 1000. The computing device 1000 may at least comprise one or more processors or processing units 1010, a memory 1020, a storage unit 1030, one or more communication units 1040, one or more input devices 1050, and one or more output devices 1060.

In some embodiments, the computing device 1000 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1000 can support any type of interface to a user (such as "wearable" circuitry and the like).

The processing unit 1010 may be a physical or virtual processor and can implement various processes based on programs stored in the memory 1020. In a multi-processor system, multiple processing units execute computer executable instructions in parallel so as to improve the parallel processing capability of the computing device 1000. The processing unit 1010 may also be referred to as a central processing unit (CPU), a microprocessor, a controller or a microcontroller.

The computing device 1000 typically includes various computer storage medium. Such medium can be any medium accessible by the computing device 1000, including, but not limited to, volatile and non-volatile medium, or detachable and non-detachable medium. The memory 1020 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1030 may be any detachable or non-detachable medium and may include a machine-readable medium such as a memory, flash memory drive, magnetic disk or another other media, which can be used for storing information and/or data and can be accessed in the computing device 1000.

The computing device 1000 may further include additional detachable/non-detachable, volatile/non-volatile memory medium. Although not shown in FIG. 10, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1040 communicates with a further computing device via the communication medium. In addition, the functions of the components in the computing device 1000 can be implemented by a single computing cluster or multiple computing machines that can communicate via communication connections. Therefore, the computing device 1000 can operate in a networked environment using a logical connection with one or more other servers, networked personal computers (PCs) or further general network nodes.

The input device 1050 may be one or more of a variety of input devices, such as a mouse, keyboard, tracking ball, voice-input device, and the like. The output device 1060 may be one or more of a variety of output devices, such as a display, loudspeaker, printer, and the like. By means of the communication unit 1040, the computing device 1000 can further communicate with one or more external devices (not shown) such as the storage devices and display device, with one or more devices enabling the user to interact with the computing device 1000, or any devices (such as a network card, a modem and the like) enabling the computing device 1000 to communicate with one or more other computing devices, if required. Such communication can be performed via input/output (I/O) interfaces (not shown).

In some embodiments, instead of being integrated in a single device, some or all components of the computing device 1000 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1000 may be used to implement video encoding/decoding in embodiments of the present disclosure. The memory 1020 may include one or more video coding modules 1025 having one or more program instructions. These modules are accessible and executable by the processing unit 1010 to perform the functionalities of the various embodiments described herein.

In the example embodiments of performing video encoding, the input device 1050 may receive video data as an input 1070 to be encoded. The video data may be processed, for example, by the video coding module 1025, to generate an encoded bitstream. The encoded bitstream may be provided via the output device 1060 as an output 1080.

In the example embodiments of performing video decoding, the input device 1050 may receive an encoded bitstream as the input 1070. The encoded bitstream may be processed, for example, by the video coding module 1025, to generate decoded video data. The decoded video data may be provided via the output device 1060 as the output 1080.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for image processing, comprising:
receiving a first image with a first resolution and at least one reference image associated with the first image, the first image and the at least one reference image being associated with a same video;
determining a difference between the first image and the at least one reference image; and
generating a second image with a second resolution based on the difference, the first image and the at least one reference image, the second resolution being higher than the first resolution,
wherein the difference is determined based on at least one temporarily derived sample value, and wherein the temporarily derived sample value is derived based on a first sample value of the first image at a first location and a second sample value of the reference image at a second location.

2. The method of claim 1, wherein the at least one reference image comprises an intermediate result generated during a compression of the first image.

3. The method of claim 1, wherein the first image comprises a first frame in the video, the at least one reference image comprises a reference frame in the video, and the second location is a corresponding sample location of the first location at the reference frame used to code the first image.

4. The method of claim 1, wherein the difference is determined by averaging at least part of the temporarily derived sample values.

5. The method of claim 1, wherein the difference is determined based on a non-linear function of the temporarily derived sample value.

6. The method of claim 1, wherein generating the second image comprises:
concatenating the difference directly with a first feature map and at least one reference feature map to obtain a concatenated feature map, the first feature map being associated with the first image and the at least one reference feature map being associated with the at least one reference image; and
generating the second image based on the concatenated feature map using a machine learning model.

7. The method of claim 1, wherein generating the second image comprises:
concatenating a difference feature map with a first feature map and at least one reference feature map to obtain a concatenated feature map, the difference feature map being associated with the difference, the first feature map being associated with the first image and the at least one reference feature map being associated with the at least one reference image; and
generating the second image based on the concatenated feature map using a machine learning model.

8. The method of claim 1, wherein generating the second image comprises:
generating the second image using a machine learning model, the machine learning model being trained with a multi-stage method, wherein an output of a first training stage is refined by a second training stage.

9. The method of claim 1, wherein generating the second image comprises:
generating the second image using a machine learning model, the machine learning model being trained with a multi-stage method, wherein a loss function used in a second training stage is determined based on an output of a first training stage.

10. The method of claim 9, wherein the loss function is calculated by:

$$L_i = A \cdot |SR_i^1 - HR_i|^p + B \cdot |SR_i^2 - HR_i'|^q + C,$$

where $L_i$ represents the loss function associated with the first image with an index i; $|\cdot|$ represents an absolute value function; $SR_i^1$ represents an absolute value function; $SR_i^1$ represents the output of the first training stage; $HR_i$ represents a high-resolution benchmark used in the first training stage; $SR_i^2$ represents an output of the second training stage; $HR_i'$ represents a high-resolution benchmark used in the second training stage; A and B represent positive numbers; p and q are greater than or equal to 1; and C represents an offset.

11. The method of claim 10, wherein the output of the first training stage is generated based on a first set of reference images and the output of the second training stage is generated based on a second set of reference images, wherein the second set of reference images are selected from the first set of reference images based on a similarity between the reference image and the first image.

12. The method of claim 10, wherein the output of the first training stage is generated based on a first set of reference images and the output of the second training stage is generated based on a second set of reference images, wherein the second set of reference images are selected from a third set of reference images based on a similarity between the reference image and the first image, the third set of reference images being different from the first set of reference images.

13. The method of claim 1, wherein a prediction, coding and decoding of a third image with the first resolution is independent of the second image.

14. The method of claim 1, further comprising:
coding a third image with the first resolution by using the second image.

15. The method of claim 1, wherein receiving the first image and the at least one reference image comprises:
decoding a flag from a bitstream; and
in response to the flag indicating a first value, receiving the first image and the at least one reference image.

16. The method of claim 1, wherein the first image comprises one color component.

17. The method of claim 1, wherein the first image comprises a first color component and a second color component different from the first color component, the second image comprises three color components, and generating the second image comprises:
generating a first intermediate result based on the first color component of the first image;
generating a second intermediate result based on the second color component of the first image;
generating the second image based on the first intermedia result and the second intermediate result.

18. An electronic device, comprising:
a processing unit; and
a memory coupled to the processing unit and having instructions stored thereon which, when executed by the processing unit, cause the electronic device to:
receive a first image with a first resolution and at least one reference image associated with the first image, the first image and the at least one reference image being associated with a same video;
determine a difference between the first image and the at least one reference image; and
generate a second image with a second resolution based on the difference, the first image and the at least one reference image, the second resolution being higher than the first resolution,
wherein the difference is determined based on at least one temporarily derived sample value, and wherein the temporarily derived sample value is derived based on a first sample value of the first image at a first location and a second sample value of the reference image at a second location.

19. A non-transitory computer-readable storage medium storing instructions that cause a processor to:
receive a first image with a first resolution and at least one reference image associated with the first image, the first image and the at least one reference image being associated with a same video;
determine a difference between the first image and the at least one reference image; and
generate a second image with a second resolution based on the difference, the first image and the at least one reference image, the second resolution being higher than the first resolution,
wherein the difference is determined based on at least one temporarily derived sample value, and wherein the temporarily derived sample value is derived based on a first sample value of the first image at a first location and a second sample value of the reference image at a second location.

* * * * *